(12) United States Patent
Leung et al.

(10) Patent No.: US 11,023,126 B2
(45) Date of Patent: Jun. 1, 2021

(54) TOUCH GESTURE CONFIRMATION

(71) Applicant: Samsung Electronics Company, Ltd., Gyeonggi-Do (KR)

(72) Inventors: Rock Anthony Leung, Vancouver (CA); Alireza Mogharrab, Surrey (CA)

(73) Assignee: SAMSUNG ELECTRONICS COMPANY, LTD., Suwon (KR)

( * ) Notice: Subject to any disclaimer, the term of this patent is extended or adjusted under 35 U.S.C. 154(b) by 44 days.

(21) Appl. No.: 16/226,208

(22) Filed: Dec. 19, 2018

(65) Prior Publication Data
US 2020/0201531 A1    Jun. 25, 2020

(51) Int. Cl.
| | |
|---|---|
| G06F 3/0488 | (2013.01) |
| G06F 9/30 | (2018.01) |
| G06F 3/041 | (2006.01) |
| G06F 3/01 | (2006.01) |
| H04M 1/72415 | (2021.01) |
| H04L 12/28 | (2006.01) |

(52) U.S. Cl.
CPC .......... *G06F 3/04883* (2013.01); *G06F 3/017* (2013.01); *G06F 3/0416* (2013.01); *G06F 9/30007* (2013.01); *H04L 12/282* (2013.01); *H04M 1/72415* (2021.01)

(58) Field of Classification Search
CPC ...... G06F 3/017; G06F 3/0482; G06F 3/0488; H04L 12/282; H04L 41/0803; H04L 41/0879
See application file for complete search history.

(56) References Cited

U.S. PATENT DOCUMENTS

| | | | |
|---|---|---|---|
| 5,731,801 A | 3/1998 | Fukuzaki | |
| 7,676,767 B2 | 3/2010 | Hofmeister | |
| 8,436,806 B2* | 5/2013 | Almalki | G06F 3/0414 345/104 |
| 8,670,752 B2* | 3/2014 | Fan | G07C 9/00309 455/414.2 |
| 8,947,364 B2* | 2/2015 | Feland, III | G06F 3/04883 345/173 |
| 9,600,103 B1* | 3/2017 | Eischeid | G06F 3/04817 |
| 10,567,190 B1* | 2/2020 | Mai | H04L 12/2834 |
| 10,613,637 B2* | 4/2020 | Goetz | G06F 19/00 |
| 2002/0022991 A1* | 2/2002 | Sharood | H02J 13/00004 702/184 |

(Continued)

*Primary Examiner* — Alvin H Tan
(74) *Attorney, Agent, or Firm* — Baker Botts L.L.P.

(57) ABSTRACT

In one embodiment, a method includes accessing data corresponding to one or more settings of a network-enabled device; and determining one or more of the settings corresponds to an enhanced security level. Each of the one or more settings are activated by a corresponding confirmation touch gesture. The method also includes detecting a number of touch inputs; and determining the number of touch inputs correspond to a confirmation touch gesture. The confirmation touch gesture includes: an initial touch input; and a confirmation touch input located at a particular area of a touch-sensitive display that is located at least a pre-determined distance from an end location of the initial touch input. The method also includes sending data corresponding to one or more of the settings activated by the confirmation touch gesture in response to determining the number of touch inputs correspond to the confirmation touch gesture.

22 Claims, 8 Drawing Sheets

(56) References Cited

U.S. PATENT DOCUMENTS

| | | | |
|---|---|---|---|
| 2004/0103153 A1* | 5/2004 | Chang | H04L 43/00 |
| | | | 709/206 |
| 2010/0025744 A1 | 2/2010 | Miyashita | |
| 2011/0012921 A1 | 1/2011 | Cholewin | |
| 2011/0099513 A1 | 4/2011 | Ameline | |
| 2011/0209058 A1 | 8/2011 | Hinckley | |
| 2013/0307764 A1* | 11/2013 | Denker | G06F 3/013 |
| | | | 345/156 |
| 2015/0169832 A1* | 6/2015 | Davis | H04M 1/72569 |
| | | | 702/19 |
| 2016/0026217 A1* | 1/2016 | Wu | G06F 1/1626 |
| | | | 361/679.56 |
| 2017/0046178 A1* | 2/2017 | Singh | G06F 3/04886 |
| 2018/0033087 A1* | 2/2018 | Delinselle | G06Q 40/08 |
| 2018/0316518 A1* | 11/2018 | Farrahi Moghaddam | |
| | | | H02J 3/14 |
| 2020/0110513 A1* | 4/2020 | Mesguich Havilio | |
| | | | G06F 3/04886 |

* cited by examiner

TOUCH GESTURE CONFIRMATION

TECHNICAL FIELD

This disclosure generally relates to touch gesture interactions.

BACKGROUND

Computing devices with touch-screen interfaces, such as for example network-enabled appliances, increasingly offer more functions and features. The increased use of computing devices with touch-screen interfaces may make operating such devices easier, but more prone to human errors. With increased control over particular settings of network-enabled devices, it may be useful for a user to confirm the settings are intended by the user and minimize performing these settings by accident.

DESCRIPTION OF EXAMPLE EMBODIMENTS

Embodiments below describe an interaction technique on a touch-screen interface where a confirmation touch gesture may be made prior to executing one or more particular settings of a network-enabled device. As an example and not by way of limitation, a confirmation touch gesture may be used when user changes a particular settings that may require confirmation (e.g. remotely turning on a smart stove, turning off a smart fridge). In particular embodiments, this confirmation touch gesture may require a touch gesture that is performed using two hands. These confirmation touch gestures may serve to confirm the settings are intended by a user and minimizes the chance of activating these settings by accident. In particular embodiments, the confirmation touch gestures may be designed to require effort and attention to perform. Such a confirmation gesture should be sufficiently challenging to ensure that the confirmation touch gesture and corresponding activation of the setting is intentionally performed.

Figure 1:
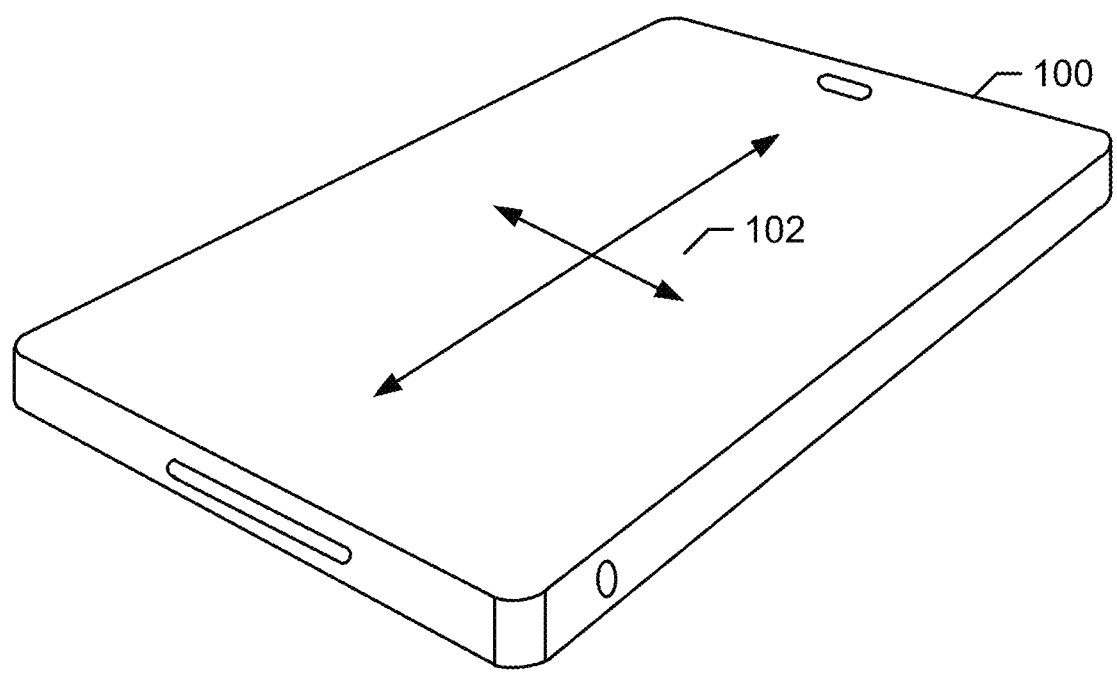
FIG. 1 illustrates an example computing device with a touch-screen interface.

FIG. 1 illustrates an example computing device with a touch-screen interface. In particular embodiments, computing device 100 may be a mobile computing device that has a touch screen 102 as an input component. In the example of FIG. 1, touch screen 102 is incorporated on a surface of computing device 100. An operating system (OS) of computing device 100 may provide a touch-screen user interface (UI) on touch screen 102 of computing device 100, through which a user may interact with the UI. In particular embodiments, the OS may correlate one or more touch inputs detected by touch screen 102 with one or more interactions with computing device 100. Although this disclosure illustrates and describes the use of particular touch gestures on a particular type of computing device with a touch screen, this disclosure contemplates handling gestures by any suitable type of computing device with a touch screen, such as for example, a network-enabled appliance, smart phone, personal computer with a touch display, tablet computer, or connected television.

Figure 2:
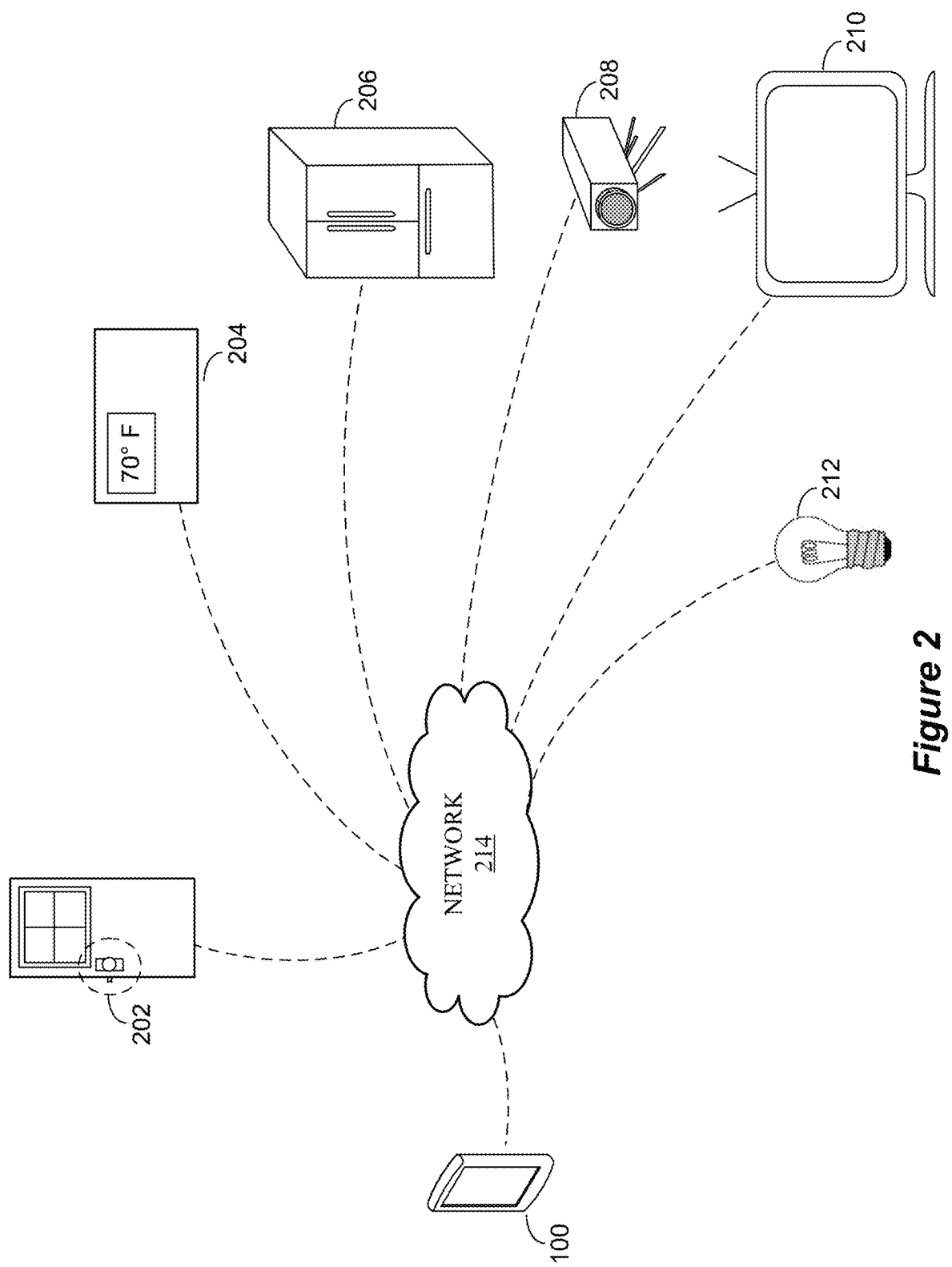
FIG. 2 illustrates an example device network.

FIG. 2 illustrates an example device network. In particular embodiments, a device network 200 may include one or more network-enabled or smart devices. As an example and not by way of limitation, a network-enabled device has at least one mode of network connectivity. As illustrated in the example of FIG. 2, examples of network-enabled devices may include a smart lock mechanism 202, smart thermostat 204, smart refrigerator 206, smart-security system 208, smart television (TV) 210, or smart lights 212. In particular embodiments, computing device 100 and network-enabled devices 202-212 may include antennae and one or more low-power and high-power radios for various types of network connections, e.g., cellular (e.g., 3G/4G/4G LTE/5G), WI-FI (e.g., 802.11n, 802.11ac, 802.11ad WiGig), Wi-Fi-based higher-level protocols (e.g., INTEL WIRELESS DISPLAY (WiDi), Wi-Fi mesh (e.g., ITU-T G.hn)), TV whitespace/mesh (TVWS, or 802.11af), Global Positioning System (GPS), BLUETOOTH, BLUETOOTH LOW ENERGY (BLE), near-field communication (NFC), satellite, pager radio, etc. In particular embodiments, a network-enabled device (e.g., 202-212) may also include external physical features, such as, for example and not by way of limitation, a button interface, a status indicator, a small/low-power screen, a memory card slot, or connection ports (e.g., UNIVERSAL SERIAL BUS (USB), Ethernet, optical). In particular embodiments, a network-enabled device (e.g., 202-212) may be able to connect to a power adapter, draw power from a received RF signal, generate power using integrated piezoelectric components, or otherwise utilize power using any conventional source.

In particular embodiments, network-enabled devices 202-212 may connect to network 214 and communicate with each other or with computing device 100 through network 214. Network 214 may be a private local-area network (LAN) or a network connected to the Internet. As an example and not by way of limitation, network 214 may include a local access point (e.g., home WI-FI network) that is connected to the Internet. In particular embodiments, computing device 100 may execute an application with a graphical user interface (GUI) to interface with one or more of network-enabled devices 202-212 through network 214. As an example and not by way of limitation, an application executed on a mobile computing device 100 may provide a GUI that may be used to configure the color of smart lights 212 or turn-on smart television 210. In particular embodiments, computing device 100 may be authenticated prior to transmission of the settings to network-enabled devices 202-212. In particular embodiments, an application executed on computing device 100 may be configured to configure or modify one or more settings of network-enabled devices 202-212. As an example and not by way of limitation, an application may be configured to wirelessly turn on a smart oven, close a network-enabled garage door, or activate or disable a smart lock.

Figure 3:
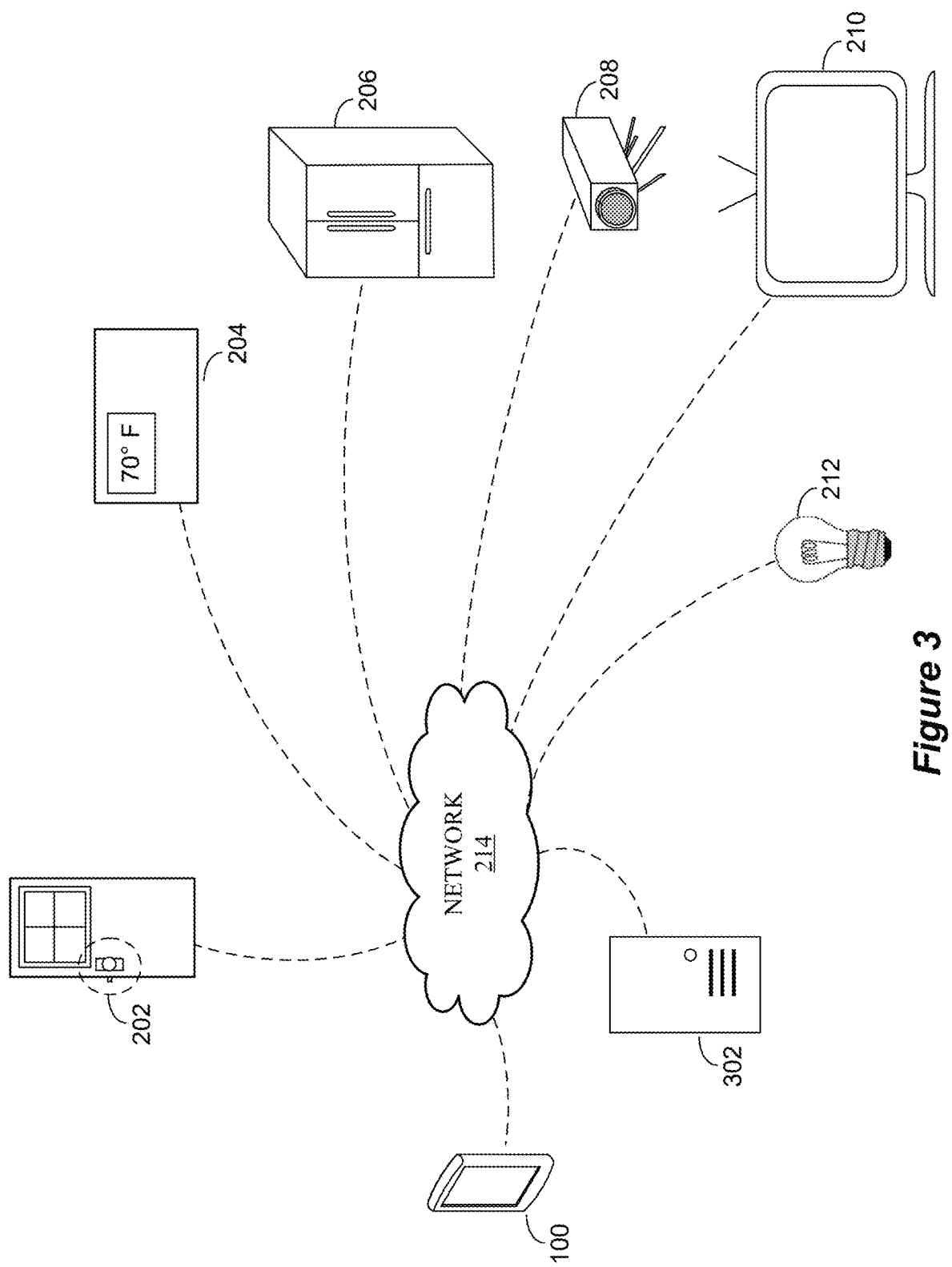
FIG. 3 illustrates an example server-based device network.

FIG. 3 illustrates an example server-based device network. A device network 200 may include one or more network-enabled devices 202-212 that transmit data and receive commands from a server 302 through network 214. In particular embodiments, computing device 100 may communicate with server 302 to provide one or settings for network-enabled device 202-212. Computing device 100 may transmit the configuration to server 302 through network 214 and server 302 may transmit the configuration to smart-security system 208 once client system 100 has been authenticated. In particular embodiments, server 302 may authenticate computing device 100 and transmit the settings to one or more network-enabled devices 202-212 through network 214 in response to the authentication. Server 302 may receive data from one or more one or more network-enabled devices 202-212. As an example and not by way of limitation, smart thermostat 204 may provide real-time temperature data and presence information to server 302 for analysis of temperature settings to optimize for energy efficiency. As another example, smart-security system 208 may be configured by a user using an application on computing device 100. Although this disclosure describes and illustrates particular network-enabled devices, this disclosure contemplates any suitable network-enabled devices, such as for example smart electrical outlets or connected audio systems.

Figure 4:
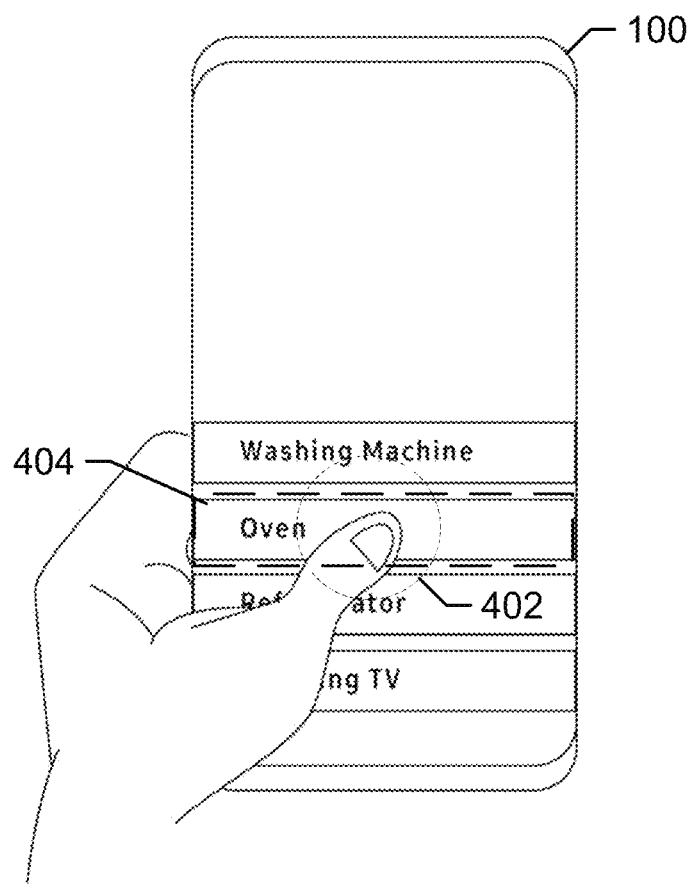
FIGS. 4-6 illustrate an example touch confirmation gesture.
Figure 5:
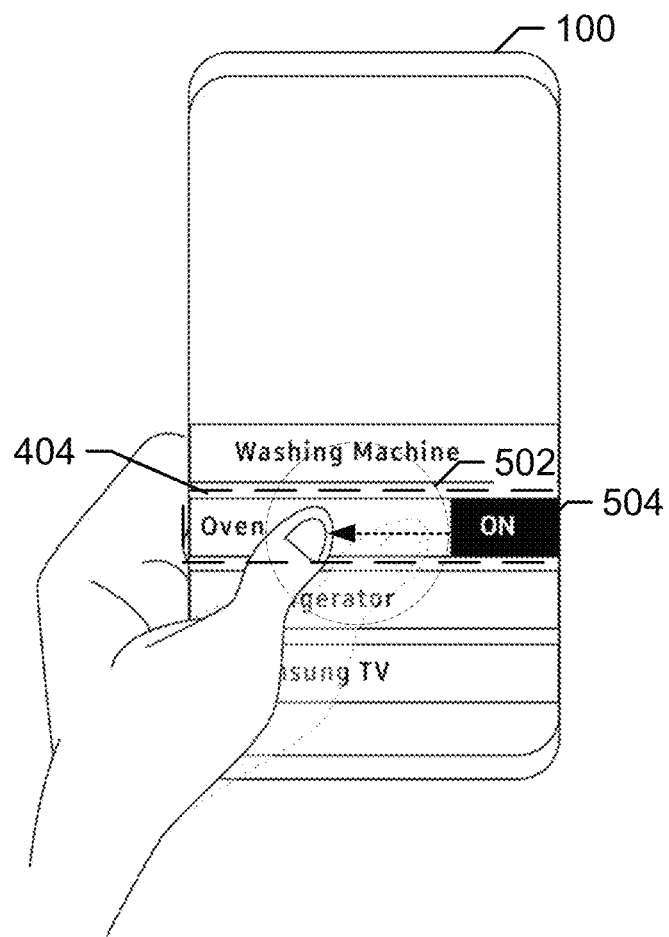
Figure 6:
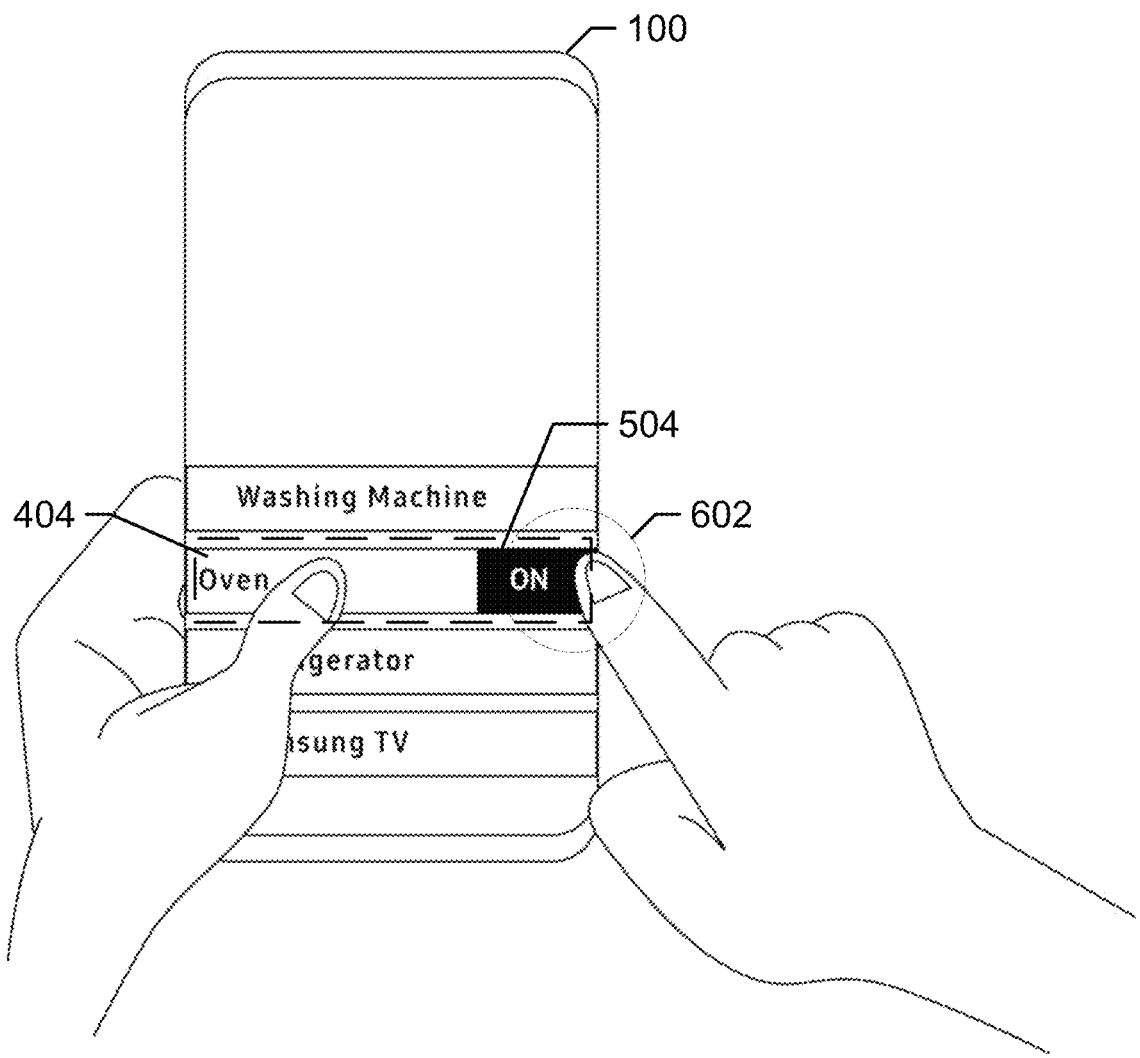

FIGS. 4-6 illustrate an example confirmation gesture performed on a touch-screen interface. Configuring some settings of network-enabled devices may be considered potentially disruptive or dangerous relative to other settings. Particular settings of network-enabled devices may have the potential of damaging the network-enabled device, damaging other property, causing harm to people, or causing other disruption. As an example and not by way of limitation, turning off a smart outlet that is connected to a running computer may cause potential damage to the computer or lead to an unrecoverable loss of data. As another example, turning on a network-enabled television during late evening or early morning hours may disrupt sleep. Configuring other settings such as, for example, remotely starting a network-enabled clothes washer or dishwasher cycle, may be difficult to undo and restart.

In particular embodiments, network-enabled devices may be configured such that initiating or configuring particular settings may correspond to an enhanced security level that involves the use of a confirmation touch gesture on a touch screen GUI to ensure the user intended to initiate or configure the particular settings. As an example and not by way of limitation, the confirmation touch gesture may be a touch gesture designed to be difficult to perform accidentally. In particular embodiments, the use of the confirmation touch gesture may be based one or more criteria, such as for example, a context of the computing device. As an example and not by way of limitation, a context associated with the computing device may include the current location of the computing device, demographics of the user, or external environment (e.g., time of day or current weather) when the setting is being executed. For example, remotely configuring a network-enabled door lock to open may require a confirmation touch gesture to prevent accidental unlocking of an entry door when location data of the user indicates that the location of the computing device is beyond a pre-determined proximity to the smart lock mechanism. For example, if a smart lock is on the front door of a user's home and the user is several miles away at work, then disabling the smart lock may require a confirmation touch gesture. On the other hand, if the user is within a few feet of the user's front door then disabling the smart lock may not require a confirmation touch gesture, i.e., the smart lock may be disabled using a relatively simple input such as contact with a GUI button.

As another example of using context to toggle requiring a confirmation touch gesture, configuring a smart TV to turn on may require a confirmation touch gesture depending on the time the particular setting is to be executed. For example, a confirmation gesture may be required to turn on the TV at 2 am but not at 6 pm. As explained more fully below, user input may be used to determine when a confirmation gesture is required. For example, a user may identify the time(s) at which turning on the TV requires the confirmation touch gesture, the time(s) at which turning on the TV does not require the confirmation touch gesture, or both. In particular embodiments, the user's habits may be identified, for example using machine learning algorithms, and those habits may be used to set requirements for a confirmation touch gesture. For example, if a user rarely or never turns on a TV at 6 pm then a confirmation touch gesture may be required to turn on the TV at that time, unless a user's specific preferences indicate otherwise.

As another example of using context to toggle requiring a confirmation touch gesture, configuring a setting of a smart oven may require a confirmation touch gesture based on the user associated with the computing device being less than 15 years old. As another example, configuring a setting of a smart thermostat may require a confirmation touch gesture based on the current weather being a very hot or cold. For example, a confirmation touch gesture may be required to turn on the heater when it is, e.g., over 80 degrees Fahrenheit indoors or outdoors. As explained above, these requirements may be user customizable (e.g., the age of the user or indoor/outdoor temperatures at which confirmation touch gestures are required may be set by a user).

In particular embodiments, one of the criteria of the confirmation touch gesture may be based on a context of the network-enabled device. As an example and not by way of limitation, a context associated with the network-enabled device may include determining that the network-enabled device is executing a process, such as for example, updating its OS. For example, configuring a setting to power off a smart television may require a confirmation touch gesture based on the smart television performing a OS update. In particular embodiments, the context of the network-enabled device may include determining a measure of potential damage to the network-enabled device, one or more users, or a device coupled to the network-enabled device if the one or more settings are activated. As an example and not by way of limitation, the measure of potential damage may be based on the size of the network-enabled device, the weight of the network-enabled device, the amount of motion of the network-enabled device if the one or more settings are activated, or an amount of heat generated by the network-enabled device if the one or more settings are activated. For example, a network-enabled oven may require a confirmation touch gesture to set a temperature above approximately 450° F. The measure of potential damage may be based on an amount of sound or light emitted by the network-enabled device if the setting is activated. As an example and not by way of limitation, network-enabled headphones may require a confirmation touch gesture to set the volume above approximately 100 decibels.

In particular embodiments, a determination about whether a confirmation touch gesture is required (such as a determination about the measure of potential damage that may occur if the corresponding setting is activated) may be based on both attributes of the network-enabled device (e.g., the amount of sound generated by the device) and the context of the computing device. For example, a confirmation touch gesture may be required to turn on a stereo system louder than a first threshold (e.g., approximately 100 decibels) at 6 pm but may not be required at lower volumes at the time. However, a confirmation touch gesture may be required to turn on a stereo system louder than a second threshold that is lower than the first threshold (e.g., approximately 60 decibels) at 2 am, but may not be required at lower volumes at the time.

In particular embodiments, use of a confirmation touch gesture may be set as default for settings that may in cases where it may be difficult for the computing device or server to determine whether the executing a setting is potentially dangerous, damaging or disruptive. For example, turning off a smart outlet may damage a particular device attached to the smart outlet, but another device may not be affected. The user, however, does know the potential impact of turning on/off an outlet and may want to add additional confirmation to a smart outlet control to prevent accidental commands to the outlet.

As illustrated in the example of FIGS. 4-6, a confirmation touch gesture may be performed on a touch-screen interface. A confirmation touch gesture may include multiple touch inputs on the touch screen. As an example and not by way of limitation, a confirmation touch gesture satisfying these criteria may involve the use of two hands. Furthermore, for additional accuracy that the confirmation touch gesture is being performed, the confirmation touch gesture may include 3 touch inputs as described below. As illustrated in the example of FIG. 4, an initial or first touch input 402 may be to touch particular area 404 of the touch-screen interface of computing device 100. As illustrated in the example of FIG. 5, initial touch input 402 may transition to a second touch input 502 include a displacement from an initial location on the touch-screen interface to an ending location. As an example and not by way of limitation, first touch input 402 may correspond to a drag and hold touch gesture of the particular area 404 of the touch-screen interface of computing device 100 using the same finger as the first touch input. In particular embodiments, the confirmation touch gesture may include a confirmation area 504 located within particular area 404, as described below.

In particular embodiments, confirmation touch input being detected at a confirmation area 504 of the touch-screen located at least a pre-determined distance (e.g., at least 6 centimeters) from an end location of an initial touch input. As an example and not by way of limitation, the endpoint of the initial touch input may be determined at the location of the touch screen that the initial touch input is relatively stationary for a pre-determined period of time (approximately 100 milliseconds). As described above, the location of confirmation area 504 may be at least the pre-determined distance from the endpoint of the first touch input 402. As an example and not by way of limitation, the second touch input 502 may expose a button on the touch-screen interface. In particular embodiments, confirmation area 504 may include an indication (e.g., text, color, boundaries, or shading) that a third or confirmation touch input should be located within confirmation area 504. As illustrated in the example of FIG. 6, a third touch input 602 may correspond to a tap of conformation area 504 of the touch-screen interface of computing device 100. In particular embodiments, third touch input 602 may be performed using the other hand from touch inputs 402 and 502. In particular embodiments, the confirmation touch gesture may require second touch input 502 and third touch input 602 be performed within a pre-determined time period. As an example and not by way of limitation, if user does not hold particular area 404 after the second touch input 502, particular area 404 may return to its original position and cover the button.

Additional aspects of a confirmation gesture may be explained with reference to FIG. 6. For example, a confirmation gesture may require one input to occur during a time that another input is still being made. For example, in FIG. 6 third input 602 may have to occur while second input 502 (i.e., dragging and holding) is occurring. In particular embodiments, an activating touch input may not be possible until another touch input has met some required attribute. For example, in FIG. 6 third input 602 may not be able to be performed until the user during second input 502 has dragged their finger a sufficiently far distance from the initial touch point. In particular embodiments, the confirmation touch gesture may include two touch inputs: an initial touch input (e.g., a hold) using one hand; and a confirmation touch input (e.g., a tap) using the other hand. Although this disclosure describes and illustrates a particular confirmation gesture, this disclosure contemplates any suitable confirmation gesture performed by a user, such as for example, using one hand on the touch-screen interface and using the other hand to touch a fingerprint reader.

Figure 7:
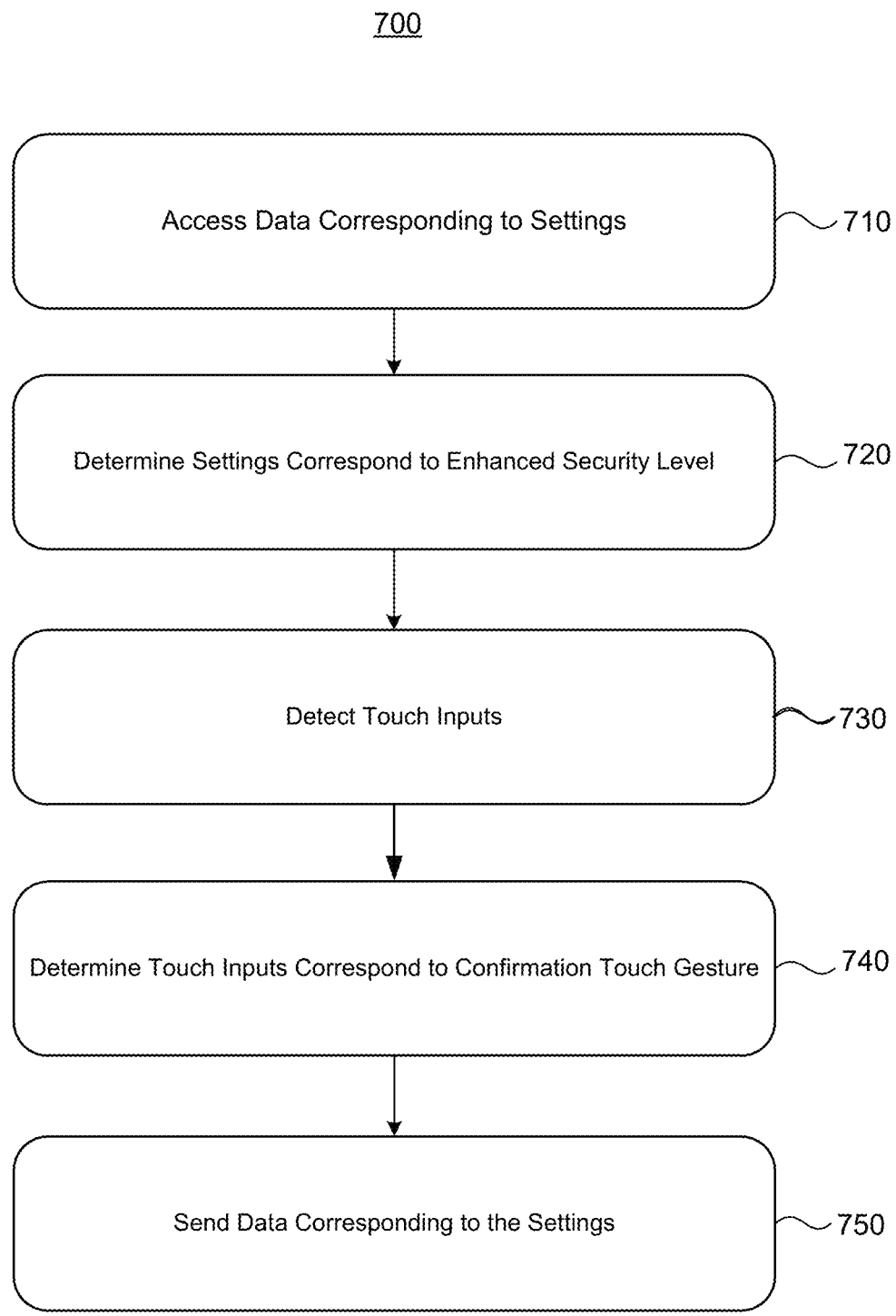
FIG. 7 illustrates an example method for configuring a setting of a network-enabled device.

FIG. 7 illustrates an example method for configuring a setting of a network-enabled device. The method 700 begins at step 710, where a computing device accesses data corresponding to one or more settings of a network-enabled device. In particular embodiments, the settings are provided to a computing device through a touch-screen interface. In particular embodiments, a server may access the settings of the network-enabled device captured by the computing device. At step 720, the computing device may determine one or more of the settings corresponds to an enhanced security level. In particular embodiments, each of the one or more settings may be activated by a corresponding confirmation touch gesture. In particular embodiments, the computing device may determine the settings correspond to the enhanced security level based on determining a context of the computing device or the network-enabled device. At step 730, the computing device may detect a number of touch inputs. In particular embodiments, an interface of the touch-sensitive display of the computing device may prompt a user to input the confirmation touch gesture.

At step 740, the computing device may determine the number of touch inputs correspond to a confirmation touch gesture. In particular embodiments, the confirmation touch gesture may include an initial touch input and a confirmation touch input located at a particular area of the touch-sensitive display that is located at least a pre-determined distance from an end location of the initial touch input. In particular embodiments, the end location of the initial touch input may be determined based on a location the initial touch input is stationary for a pre-determined period of time. At step 750, the computing device may send data corresponding to one or more of the settings activated by the confirmation touch gesture in response to determining the number of touch inputs correspond to the confirmation touch gesture.

Particular embodiments may repeat one or more steps of method 700 of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for configuring a setting of a network-enabled device, including the particular steps of the method of FIG. 7, this disclosure contemplates any suitable method for configuring a setting of a network-enabled device including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
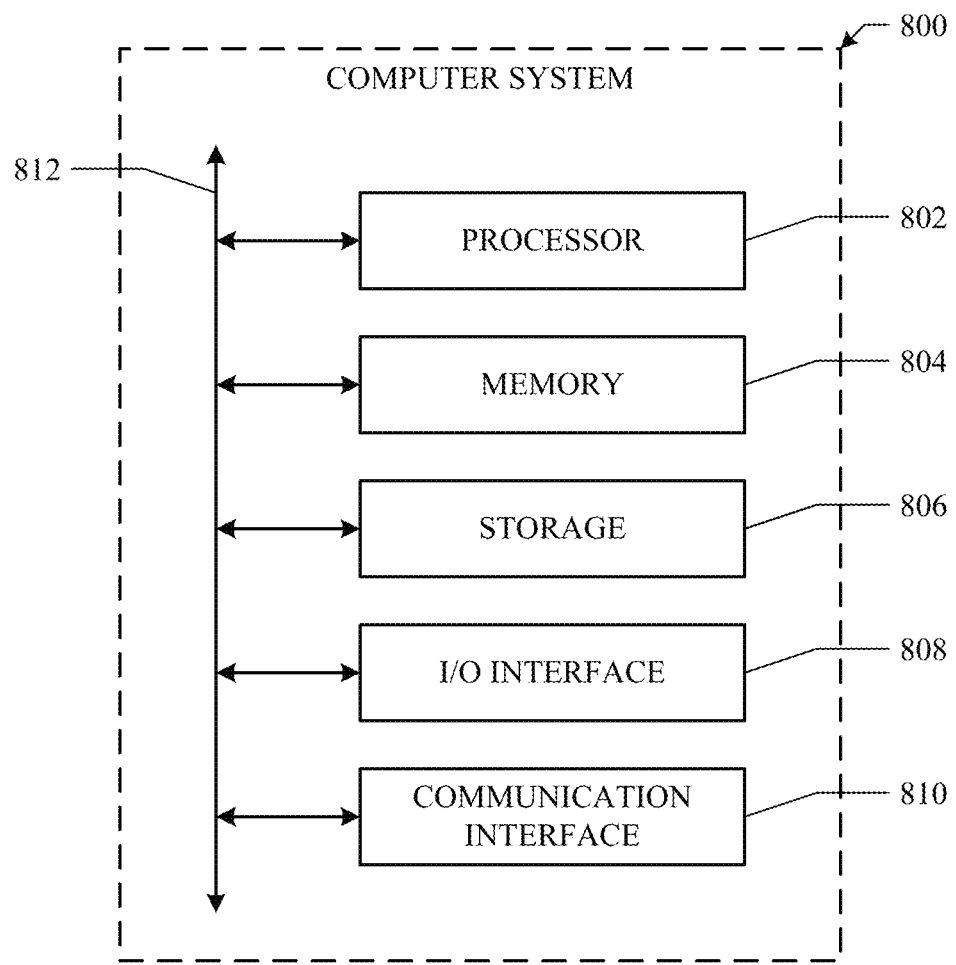
FIG. 8 illustrates an example computer system.

FIG. 8 illustrates an example computer system. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods de-scribed or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suit-able internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This dis-closure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Indus-try Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure de-scribes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or un-locked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method comprising:
by a mobile computing device, accessing data corresponding to one or more settings for each of a plurality of network-enabled appliance devices, wherein each of the plurality of appliance devices is associated with one or more attributes, wherein the mobile computing device and each of the plurality of appliance devices are communicatively connected to each other, and wherein the mobile computing device is operable to configure settings of each of the plurality of appliance devices;
by the mobile computing device, determining one or more of the settings of a first and second appliance devices from the plurality of appliance devices corresponds to an enhanced security level;
by the mobile computing device, determining, for each of the one or more settings corresponding to the enhanced security level, a confirmation touch gesture is required for the respective setting of the first and second appliance devices to be configured by the mobile computing device based on the one or more attributes associated with the first and second network-enabled appliances and a context associated with the mobile computing device;
by the mobile computing device, detecting a plurality of touch inputs associated with the first appliance device within a first area of a touch-sensitive display at the mobile computing device, wherein the touch-sensitive display comprises a plurality of areas corresponding to the plurality of appliance devices, respectively, and wherein the touch-sensitive display is operable to receive touch inputs associated with the plurality of appliance devices;
by the mobile computing device, determining the plurality of touch inputs correspond to a first confirmation touch gesture corresponding to a first setting of the one or more settings corresponding to the enhanced security level of the first appliance device, wherein the first confirmation touch gesture comprises:
an initial touch input; and
a confirmation touch input located at a particular area of the touch-sensitive display that is located at least a pre-determined distance from an end location of the initial touch input; and
by the mobile computing device, sending data corresponding to the first setting of the first appliance device configured by the confirmation touch gesture in response to determining the plurality of touch inputs correspond to the first confirmation touch gesture.

2. The method of claim 1, wherein determining the plurality of touch inputs correspond to the first confirmation touch gesture corresponding to the first setting of the one or more settings corresponding to the enhanced security level of the first appliance device comprises determining the end location of the initial touch input based on a location the initial touch input is stationary for a pre-determined period of time.

3. The method of claim 2, wherein the pre-determined period of time is at least approximately 100 milliseconds.

4. The method of claim 1, wherein determining the one or more of the settings of the first appliance device corresponds to the enhanced security level comprises determining the context of the mobile computing device.

5. The method of claim 4, wherein the context comprises a time of day.

6. The method of claim 4, wherein the context comprises a location of the computing device.

7. The method of claim 6, wherein determining the one or more of the settings of the first appliance device corresponds to the enhanced security level comprises determining that the location of the mobile computing device is beyond a predetermined proximity of the first appliance device.

8. The method of claim 4, wherein the context comprises one or more permissions associated with a user of the mobile computing device and with the first appliance device.

9. The method of claim 1, wherein determining the one or more of the settings of the first appliance device corresponds to the enhanced security level comprises determining a context of the first appliance device.

10. The method of claim 9, wherein determining a context of the first appliance device comprises determining that the first appliance device is executing a process; and
the one or more settings comprise powering off the first appliance device.

11. The method of claim 1, wherein determining the one or more of the settings of the first appliance device corresponds to an enhanced security level comprises determining a measure of potential damage to the first appliance device, one or more users, or a device coupled to the first appliance device if the one or more settings are activated.

12. The method of claim 11, wherein the measure of potential damage is based on one or more of: a size of the first appliance device, a weight of the first appliance device, an amount of motion of the first appliance device if the one or more settings are activated, or an amount of heat generated by the first appliance device if the one or more settings are activated.

13. The method of claim 1, wherein determining the one or more of the settings of the first appliance device corresponds to an enhanced security level comprises determining an amount of sound or light emitted by the first appliance device if the setting is activated.

14. The method of claim 13, wherein the first confirmation touch gesture comprises:
the initial touch input comprises:
a first touch input between a user and the touch-sensitive display of the mobile computing device; and
a drag gesture made in a first direction while contacting the touch-sensitive display; and
the confirmation touch input comprises a second touch input between the user and the touch-sensitive display, the second touch input made after the drag gesture and before the first contact ends.

15. The method of claim 1, wherein the first confirmation touch gesture comprises a touch gesture that must be performed using two hands.

16. The method of claim 1, wherein each of the plurality of touch inputs occurs during at least one other touch input.

17. The method of claim 1, wherein the pre-determined distance is more than approximately 6 centimeters.

18. The method of claim 1, wherein the confirmation touch gesture required for the respective setting to be configured is distinct with respect to each of the one or more settings.

19. The method of claim 1, wherein the initial touch input is located in the first area of the touch-sensitive display corresponding to the first appliance device, and wherein initial touch inputs for the plurality of network-enabled appliance devices are located in the plurality of areas of the touch-sensitive display, respectively.

20. One or more computer-readable non-transitory storage media embodying software that is operable when executed to:
    by a mobile computing device, access data corresponding to one or more settings for each of a plurality of network-enabled appliance devices, wherein each of the plurality of appliance devices is associated with one or more attributes, wherein the mobile computing device and each of the plurality of appliance devices are communicatively connected to each other, and wherein the mobile computing device is operable to configure settings of each of the plurality of appliance devices;
    by the mobile computing device, determine one or more of the settings of a first and second appliance devices from the plurality of appliance devices corresponds to an enhanced security level;
    by the mobile computing device, determine, for each of the one or more settings corresponding to the enhanced security level, a confirmation touch gesture is required for the respective setting of the first and second appliance devices to be configured by the mobile computing device based on the one or more attributes associated with the first and second network-enabled appliances and a context associated with the mobile computing device;
    by the mobile computing device, detect a plurality of touch inputs associated with the first appliance device within a first area of a touch-sensitive display at the mobile computing device, wherein the touch-sensitive display comprises a plurality of areas corresponding to the plurality of appliance devices, respectively, and wherein the touch-sensitive display is operable to receive touch inputs associated with the plurality of appliance devices;
    by the mobile computing device, determine the plurality of touch inputs correspond to a first confirmation touch gesture corresponding to a first setting of the one or more settings corresponding to the enhanced security level of the first appliance device, wherein the first confirmation touch gesture comprises:
      an initial touch input; and
      a confirmation touch input located at a particular area of the touch-sensitive display that is located at least a pre-determined distance from an end location of the initial touch input; and
    by the mobile computing device, send data corresponding to the first setting of the first appliance device configured by the confirmation touch gesture in response to determining the plurality of touch inputs correspond to the first confirmation touch gesture.

21. The media of claim 20, wherein software is further operable to determine the end location of the initial touch input based on a location the initial touch input is stationary for a pre-determined period of time.

22. A system comprising:
    one or more processors; and
    a non-transitory memory coupled to the processors comprising instructions executable by the processors, the processors being operable when executing the instructions to:
      by a mobile computing device, access data corresponding to one or more settings for each of a plurality of network-enabled appliance devices, wherein each of the plurality of appliance devices is associated with one or more attributes, wherein the mobile computing device and each of the plurality of appliance devices are communicatively connected to each other, and wherein the mobile computing device is operable to configure settings of each of the plurality of appliance devices;
      by the mobile computing device, determine one or more of the settings of a first and second appliance devices from the plurality of appliance devices corresponds to an enhanced security level;
      by the mobile computing device, determine, for each of the one or more settings corresponding to the enhanced security level, a confirmation touch gesture is required for the respective setting of the first and second appliance devices to be configured by the mobile computing device based on the one or more attributes associated with the first and second network-enabled appliances and a context associated with the mobile computing device;
      by the mobile computing device, detect a plurality of touch inputs associated with the first appliance device within a first area of a touch-sensitive display at the mobile computing device, wherein the touch-sensitive display comprises a plurality of areas corresponding to the plurality of appliance devices, respectively, and wherein the touch-sensitive display is operable to receive touch inputs associated with the plurality of appliance devices;
      by the mobile computing device, determine the plurality of touch inputs correspond to a first confirmation touch gesture corresponding to a first setting of the one or more settings corresponding to the enhanced security level of the first appliance device, wherein the first confirmation touch gesture comprises:
        an initial touch input; and
        a confirmation touch input located at a particular area of the touch-sensitive display that is located at least a pre-determined distance from an end location of the initial touch input; and
      by the mobile computing device, send data corresponding to the first setting of the first appliance device configured by the confirmation touch gesture in response to determining the plurality of touch inputs correspond to the first confirmation touch gesture.

* * * * *